(12) United States Patent
Bailey et al.

(10) Patent No.: US 11,648,994 B2
(45) Date of Patent: May 16, 2023

(54) INTEGRATED CONTROL METHOD FOR BALANCING A TWO-WHEELED VEHICLE USING CONTROL MOMENT GYROSCOPES AND DRIVE-BY-WIRE STEERING SYSTEMS

(71) Applicant: Lit Motors Corporation, San Francisco, CA (US)

(72) Inventors: David Arthur Bailey, Glendale, AZ (US); Daniel Kee Young Kim, San Francisco, CA (US)

(73) Assignee: Lit Motors Corporation, Portland, OR (US)

( * ) Notice: Subject to any disclaimer, the term of this patent is extended or adjusted under 35 U.S.C. 154(b) by 0 days.

(21) Appl. No.: 16/979,094

(22) PCT Filed: Mar. 7, 2019

(86) PCT No.: PCT/US2019/021163
§ 371 (c)(1),
(2) Date: Sep. 8, 2020

(87) PCT Pub. No.: WO2019/173597
PCT Pub. Date: Sep. 12, 2019

(65) Prior Publication Data
US 2021/0107573 A1 Apr. 15, 2021

Related U.S. Application Data

(60) Provisional application No. 62/639,942, filed on Mar. 7, 2018.

(51) Int. Cl.
*B62D 37/06* (2006.01)
*G05D 1/08* (2006.01)
(Continued)

(52) U.S. Cl.
CPC .............. *B62D 37/06* (2013.01); *B62J 27/00* (2013.01); *B62J 45/4152* (2020.02);
(Continued)

(58) Field of Classification Search
CPC ............ B60G 21/08; B60G 2400/0511; B60G 2401/28; B62D 37/06; B62K 11/02;
(Continued)

(56) References Cited

U.S. PATENT DOCUMENTS 3,373,832 A * 3/1968 Summers ............... B62D 37/06
180/209
4,200,168 A 4/1980 Moog
(Continued)

FOREIGN PATENT DOCUMENTS

CN 112292647 A 1/2021
DE 2518574 A1 11/1975
(Continued)

OTHER PUBLICATIONS

Final Office Action for U.S. Appl. No. 16/085,975, dated Feb. 11, 2021, 11 pages.
(Continued)

*Primary Examiner* — Daniel L Greene
(74) *Attorney, Agent, or Firm* — Elliott. Ostrander & Preston, P.C.

(57) ABSTRACT

Steering is used to augment the CMG-based balance control of a two-wheeled vehicle, e.g., a bicycle, electric bicycle ("ebike"), scooter, electric scooter, moped, or motorcycle. A control architecture enables a two wheeled vehicle with simultaneously or alternating mechatronic attitude control systems to balance autonomously at rest or while dynamically driven with mechatronic command.

2 Claims, 14 Drawing Sheets

(51) Int. Cl.
  *B62J 45/415* (2020.01)
  *B60G 21/08* (2006.01)
  *B62J 27/00* (2020.01)
(52) U.S. Cl.
  CPC ........... *G05D 1/0891* (2013.01); *B60G 21/08* (2013.01); *B60G 2400/0511* (2013.01); *B60G 2401/28* (2013.01); *B62K 2202/00* (2013.01)
(58) Field of Classification Search
  CPC ... B62K 2202/00; G05D 1/0891; B62J 27/00; B62J 45/4152
  See application file for complete search history.

(56) References Cited

U.S. PATENT DOCUMENTS

| | | | | |
|---|---|---|---|---|
| 5,799,901 | A * | 9/1998 | Osder | G05D 1/0858 |
| | | | | 416/114 |
| 5,820,439 | A | 10/1998 | Hair, III | |
| 7,006,901 | B2 | 2/2006 | Wang | |
| 8,919,788 | B2 * | 12/2014 | Kim | B60G 17/0162 |
| | | | | 280/5.506 |
| 11,167,816 | B2 | 11/2021 | Bailey | |
| 2004/0098185 | A1 | 5/2004 | Wang | |
| 2009/0222164 | A1 | 9/2009 | Seiniger et al. | |
| 2010/0122859 | A1 * | 5/2010 | Schroll | B62D 57/00 |
| | | | | 180/54.1 |
| 2011/0231085 | A1 | 9/2011 | Kim et al. | |
| 2011/0295449 | A1 | 12/2011 | Kreider et al. | |
| 2012/0298430 | A1 * | 11/2012 | Schroll | B62D 57/02 |
| | | | | 180/8.1 |
| 2013/0233100 | A1 * | 9/2013 | Kim | G01C 19/06 |
| | | | | 74/5.95 |
| 2013/0238233 | A1 | 9/2013 | Kim et al. | |
| 2013/0274995 | A1 * | 10/2013 | Kim | B62D 37/06 |
| | | | | 701/36 |
| 2014/0054867 | A1 * | 2/2014 | Kim | B60G 17/01908 |
| | | | | 280/5.509 |
| 2014/0129087 | A1 * | 5/2014 | Takenaka | B62K 21/00 |
| | | | | 701/41 |
| 2015/0168952 | A1 | 6/2015 | Kamen et al. | |
| 2016/0232722 | A1 * | 8/2016 | Morishima | G09B 19/167 |
| 2017/0203785 | A1 | 7/2017 | Naik et al. | |
| 2019/0077480 | A1 | 3/2019 | Bailey | |
| 2020/0102027 | A1 | 4/2020 | Kim et al. | |
| 2021/0107573 | A1 | 4/2021 | Bailey et al. | |

FOREIGN PATENT DOCUMENTS

| | | |
|---|---|---|
| EP | 1563716 A2 | 8/2005 |
| EP | 3429910 A1 | 1/2019 |
| EP | 3601021 A1 | 2/2020 |
| EP | 3762801 A1 | 1/2021 |
| EP | 3429910 B1 | 5/2021 |
| HK | 191271949 | 7/2019 |
| HK | 40003715 | 9/2021 |
| JP | 2006513075 A | 4/2006 |
| JP | 2008024235 A | 2/2008 |
| JP | 2013522108 A | 6/2013 |
| JP | 2020515469 A | 5/2020 |
| JP | 2021515340 A | 6/2021 |
| KR | 1020130013482 A | 2/2013 |
| KR | 1020140100324 A | 8/2014 |
| KR | 20200118907 A | 10/2020 |
| TW | 201345767 A | 11/2013 |
| TW | 201733844 A | 10/2017 |
| WO | 2011115699 A1 | 9/2011 |
| WO | 2013130656 A1 | 9/2013 |
| WO | 2013130659 A1 | 9/2013 |
| WO | WO-2014106547 A1 * | 7/2014 ............ B62D 37/06 |
| WO | 2017161308 A1 | 9/2017 |
| WO | 2018183962 A1 | 10/2018 |
| WO | 2019173597 A1 | 9/2019 |

OTHER PUBLICATIONS

Notice of Grant for European Patent Application No. 17767657.4, dated Nov. 2, 2020, 30 pages.
International Preliminary Report on Patentability for International Patent Application No. PCT/US2019/021163, dated Sep. 8, 2020, 6 pages.
International Search Report and Written Opinion for International Patent Application No. PCT/US2019/021163, dated Jun. 25, 2019, 7 pages.
Colvin, Gregory R., "Development and Validation of Control Moment Gyroscopic Stablization," Ohio State University, Feb. 2014, 29 pages.
Extended European Search Report for European Patent Application No. 17767657.4, dated Jan. 30, 2020, 9 pages.
Extended European Search Report for European Patent Application No. 1877005.2, dated Dec. 16, 2020, 11 pages.
Extended European Search Report for European Patent Application No. 19765129.2, dated Nov. 5, 2021, 6 pages.
International Preliminary Report on Patentability for International Patent Application No. PCT/US2017/023025, dated Sep. 18, 2018, 6 pages.
International Preliminary Report on Patentability for International Patent Application No. PCT/US2018/025571, dated Oct. 1, 2019, 10 pages.
International Search Report and Written Opinion for International Patent Application No. PCT/US2017/023025, dated May 29, 2017, 7 pages.
International Search Report and Written Opinion for International Patent Application No. PCT/US2018/025571, dated Jul. 20, 2018, 12 pages.
Lam, Pom Yuan, "Gyroscopic Stabilization of a Kid-Sized Bicycle," 2011 IEEE 5th International Conference on Cybernetics and Intelligent Systems, Sep. 17-19, 2011, pp. 247-252.
Non-final Office Action for U.S. Appl. No. 16/085,975, dated Jun. 11, 2020, 14 pages.
Non-Final Office Action for U.S. Appl. No. 16/499,833, dated Jun. 10, 2021, 22 pages.
Notice of Allowance for U.S. Appl. No. 16/085,975, dated Apr. 14, 2021, 34 pages.
Notice of Allowance for U.S. Appl. No. 16/499,833, dated Jan. 14, 2022, 10 pages.
Notice of Reasons for Rejection for Japanese Patent Application No. 2020-515469, dated Dec. 1, 2021, 19 pages.
Office Action for Taiwan Patent Application No. 106109036, dated Apr. 20, 2020, 12 pages.
Yetkin, Harun, et al. "Gyroscopic Stabilization of an Unmanned Bicycle," Conference Paper in Proceedings of the American Control Conference, Jun. 2014, 7 pages.
U.S. Appl. No. 17/733,940, filed Apr. 29, 2022, David Arthur Bailey.
International Search Report and Written Opinion for International Patent Application No. PCT/US22/27145 (dated Aug. 18, 2022), 12 pages.

* cited by examiner

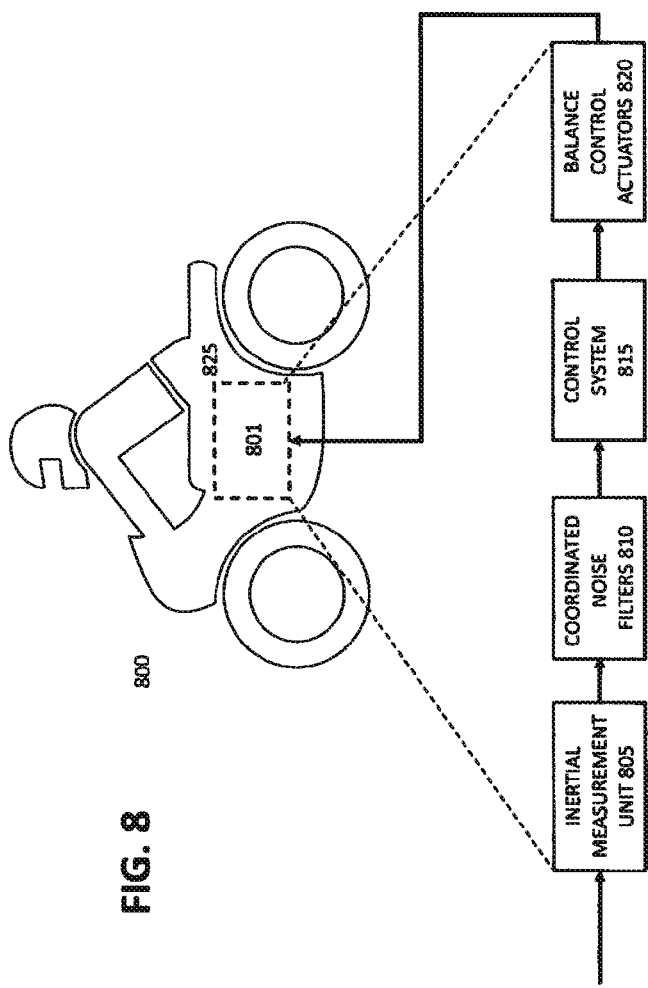

INTEGRATED CONTROL METHOD FOR BALANCING A TWO-WHEELED VEHICLE USING CONTROL MOMENT GYROSCOPES AND DRIVE-BY-WIRE STEERING SYSTEMS

CROSS-REFERENCE TO RELATED APPLICATIONS

This patent application is related, and claims priority, to PCT application PCT/US2019/021163, filed Mar. 7, 2019, entitled "Integrated Control Method for Balancing a Two-Wheeled Vehicle Using Control Moment Gyroscopes and Drive-by-Wire Systems", which claims the benefit of and priority to provisional patent application, No. 62/639,942, filed Mar. 7, 2018, entitled "Integrated Control Method for Balancing a Two Wheeled Vehicle Using Control Moment Gyroscopes and Drive-by-Wire Steering Systems", the entire contents of which are incorporated herein by reference.

TECHNICAL FIELD

Embodiments of the invention relate to control moment gyroscope (CMG)-based two wheeled vehicle balance control.

BACKGROUND

Embodiments of the invention relate to the Control Moment Gyro (CMG)-based two wheeled vehicle balance control, as described in U.S. patent application Ser. No. 16/085,975, filed Sep. 17, 2018, which claims priority to PCT application PCT/US17/23025, entitled "Control of a Two-Wheeled Self-Balancing Vehicle", filed Mar. 17, 2017, which claims priority to US Provisional Patent Application No. 62/309,893, filed Mar. 17, 2016, the entire contents of which are incorporated herein by reference. Previously, the CMG-based two wheeled balance control used one or more CMGs to provide torque about the axis parallel to the wheel ground contact line as the only control induced balancing torque

BRIEF DESCRIPTION OF THE DRAWINGS

FIG. 8 illustrates an embodiment of the invention.

DETAILED DESCRIPTION

Embodiments of the invention describe methods, apparatuses, and systems for control of a two-wheeled self-balancing vehicle. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
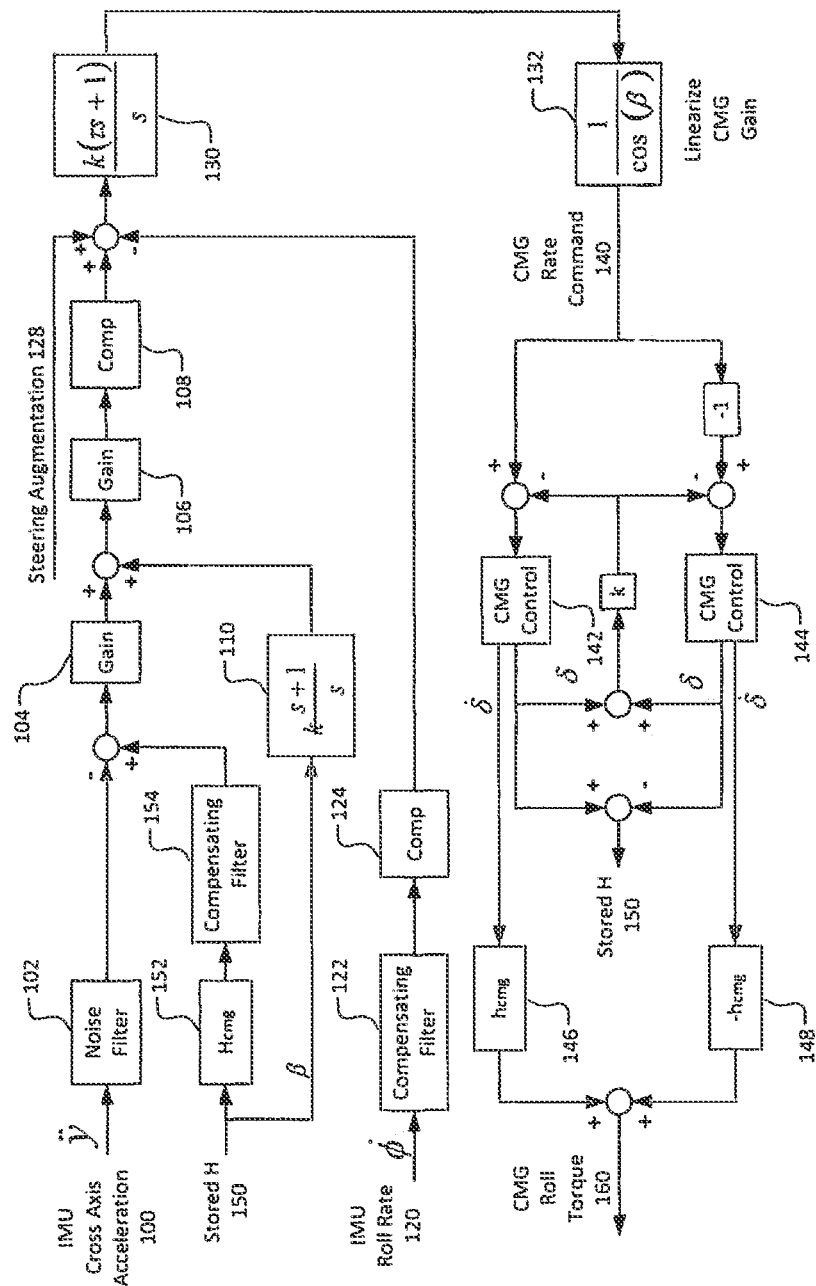
FIG. 1 is a control block diagram for a two-wheeled self-balancing vehicle according to an embodiment.

FIG. 1 is a control block diagram for a two-wheeled self-balancing vehicle according to an embodiment. In some embodiments, the control flow provides for IMU cross axis acceleration 100 for the vehicle being provided to a noise filter 102. A control value $H_{cmg}$ 152 is also applied to stored control value H 150, and then is filtered by a compensating filter 154 (which may be the same order as the noise filter 102). The output of the noise filter 102 is subtracted from the output of the compensating filter 154, with the difference being subjected to a first gain 104, which is then added to the stored H value 150 times the value $k \times (s+1)/s$ (element 110, wherein k is a constant and s is the Laplace operator). The resulting value is multiplied by a second gain 106 and then compensation 108 is added.

In some embodiments, an IMU roll rate 120 is filtered by a second compensating filter 122 (wherein the compensating filter may be one order less than the noise filter) to which is added compensation 124. The result is subtracted from compensation 108 to generate a difference. In some embodiments, a steering augmentation 128 is added to the difference, wherein the steering augmentation is further described below.

In some embodiments, the result is multiplied times the value $k \times (\tau s+1)/s$ (element 130, where $\tau$ is the time constant of the lead term in the transfer function). CMG gain is then linearized by $1/\cos(\beta)$ (element 132) to generate the CMG rate command 140, the command being provided to the first CMG control 142 and second CMG control 144, producing CMG gimbal angles $\delta$. The sum of the gimbal angles is fed back in the generation of the CMG rate command, and the difference between the CMG gimbal angles produces the stored H control value 150. As shown, the sum of $\delta$ dot values from the CMG controls 142-144 times $h_{cmg}$ (the angular momentum of the CMG) 146 and $-h_{cmg}$ 148 values is the CMG roll torque 160.

Gyroscopes are angular momentum storage elements built around a rotating flywheel. The flywheel acts as a torque actuator, by transferring angular momentum from the CMG array (comprising one or more CMGs that provide roll torque) to the vehicle. Rotating the angular momentum vector produces a torque in the direction of rotation and perpendicular to the angular momentum vector. The reaction torque to this generated torque is applied to the vehicle. Using a pair of CMGs with one angular momentum vector pointing up and the other angular momentum pointing down and rotating them in opposite directions results in torque in a single axis. The axis of interest is the roll axis. The angular momentum vectors aren't required to be up and down, but rather arranged such the nominal vector sum is zero, and with sufficient accuracy such that the sum of the angular momentum vectors can made to grow and remain directed along the roll axis of the vehicle. Symmetry results in the equal and opposite angular moment being relayed in the vehicle. A change in length of the angular momentum vector results in torque being applied to the vehicle. A "CMG" generally describes a gyroscope specifically applied for attitude control of rigid bodies (traditionally used in satellites and spacecraft). As described below, with various configurations, a CMG system is applied in a two-wheeled self-balancing vehicle.

The control of a two-wheeled self-balancing vehicle, also referred to as a bike herein, involves forces that are more complex than a rocket example. A sensor is required to point the Center of Gravity (CG) to the point of contact on the ground. When a bike is traversing a corner there is a large centrifugal force that has to be counteracted by the gravitational force. If the coordinate system origin is at the contact of the back tire with the ground, then the x axis is the direction from the back tire to the front tire. The y axis then is perpendicular to the direction of travel and parallel to the ground and pointing to the right of the direction of travel, and the z axis is into the ground.

In some embodiments, an accelerometer is utilized to measure an angle in a two-wheeled vehicle control system. In such an implementation, an accelerometer detecting acceleration in the y-direction in body coordinates (coordinates fixed in relation to the two-wheeled vehicle) may be a more useful sensor than a gyroscope measuring attitude based on world coordinates (coordinates in relation to the earth). There are five basic components to the y-axis acceleration if the Inertial Measurement Unit (IMU) is mounted significantly above the ground, which is the roll axis. The three large components are the acceleration due to centrifugal force, the acceleration due to the gravitational force, and the acceleration due to the CMGs. The two minor accelerations at nominal speeds are due to the change in direction of the angular momentum of the front and back wheels.

Balance control can't use y-axis acceleration by itself, but rather the sum of all the accelerations except the CMG acceleration is the quantity needed to control the balance. To convert y-axis acceleration to the angle of the net force vector certain calculations are needed. The linear acceleration is converted to roll acceleration by dividing by the distance from the roll axis (ground) to the accelerometer, if the IMU is centered in the vehicle. If the vehicle is not in a skid then forces from the gravity, centrifugal force are countered by forces between the pavement and the tires. The forces of the tire pavement interface do not cause a torque, because they act through the roll axis. With the roll acceleration, the roll torque can be determined by dividing by the roll axis moment of inertia. The net torque after the torque generated by the CMGs is removed is the disturbance torque. The net torque is the force multiplied by the distance from the CG to the pavement times the sine of the desired roll angle. For small angles sine of the angle is approximately the angle. This angle is the variation from vertical if the bike is stopped or driving straight. It is also the angle that is the error between going around a perfectly coordinated curve and starting to roll the bike.

The roll angle for the attitude from an IMU can be calculated from the direction of the front tire, and the forward velocity of the bike, if the tires do not slip.

In some embodiments, the improved measurement utilizing the accelerator unit enables the control to instantly detect that a tire is slipping because the lateral acceleration changes, and thus the control can react to the slippage. This can prevent a fall when traveling around a curve. As expressed in an equation:

$$\ddot{\varphi} = \{(m_{tf} \cdot R_{tfc} + m_f \cdot h_f + m_{tr} \cdot R_{trc}) g \cdot \sin(\varphi) + (\dot{\delta}_1 \cos(\delta_1) - \dot{\delta}_2 \cos(\delta_2)) H_{CMG} + Q_{rtc} + Q_{trx} + Q_{tfx}\} / J_{xxeff} \quad [1]$$

Where:
ø is roll angle
$m_{tf}$ is mass tire front
$R_{tfc}$ is radius of tire front contact
$m_f$ is mass of frame
$h_{cg}$ if height of the frame center of gravity
$m_{tr}$ is the mass of tire rear
$R_{trc}$ is the radius of tire rear at contact
g gravitational constant
δ CMG gimbal angle
$H_{CMG}$ is the angular momentum of the CMG
$Q_{rtc}$ is the torque from the centrifugal roll torque
$Q_{trx}$ is the rear tire toque about x axis clue to angular momentum change
$Q_{tfx}$ is the front tire torque about the x axis clue to angular momentum change
$J_{xxeff}$ is the effective moment of inertia about the x axis The centrifugal force terms all have a common term.

$$\omega^2 \cdot R_{turn} = \text{Speed}^2 \cdot \tan(\psi)/p \quad [2]$$

Psi (ψ) is the angle of the front tire and p is the wheel base. The three centrifugal forces are this term times the mass of each tire and the mass of the frame. The torques produced are the height of the center of gravity of each component times the cos of the roll angle. If the steering angle is constant then the centrifugal torque increases as the square of the speed and decreases by the fact that the roll angle increases and the torsion arm get smaller. The angular momentum torque from the wheels is the angular momentum vector of each wheel. This is a function of roll angle for the rear wheel, and the steering angle and roll angle for the front wheel. The cross product of the turning angular rate vector with the angular momentum vector results in a torque vector and the component of this vector with the roll axis is the roll torque due to change in direction on the wheel angular momentum.

The accelerometer term is the roll axis angle acceleration times the lever arm from the contact point on the road to the IMU. The y-axis imbedded in the bike rolls with the bike. Taking the y-axis acceleration dividing by the IMU height and multiplying by the bike CG height scales the acceleration to the center of gravity. Next, the component of the acceleration due to the CMG torque is removed, and this is multiplied by the effective moment of inertia about the roll axis, which results in a force component. This result is the total force acting on the bike CG times the sine of the angle between the direction of the force and the direction to the roll axis. This is the parameter needed for control, and such parameter immediately detects wheel slip and accurately calculates the geometry of the bike dynamics. This term is faster and more accurate than using the IMU attitude and trying to correct the IMU attitude for bike dynamics.

Figure 2:
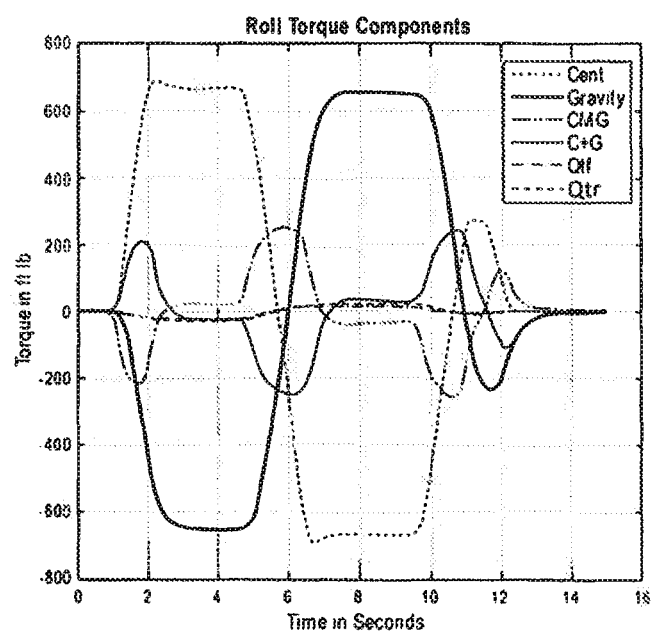
FIG. 2 is an illustration of roll torque components for a two-wheeled vehicle at a speed of 25 miles per hour (MPH).

FIG. 2 is an illustration of roll torque components for a two-wheeled vehicle at a speed of 25 miles per hour (MPH). Steering feedforward is a new term that arises from studying the bike roll torque components. At 25 MPH, in performing an aggressive dog leg turn combination the roll torque components are as illustrated in FIG. 2.

In this illustration, the centrifugal force torque overshoots because the bike gets fully into the turn before the CMGs can get the bike rolled over to compensate for the centrifugal force. The gravity torque ideally will match the centrifugal torque and the sum of all the torques less the CMG torque will become zero. In this case the CMGs have to produce well over 200 foot pounds of torque to control the bike.

To identify the term that leads the centrifugal force, the front wheel angle is differentiated and plotted against the CMG gimbal rate command.

Figure 3:
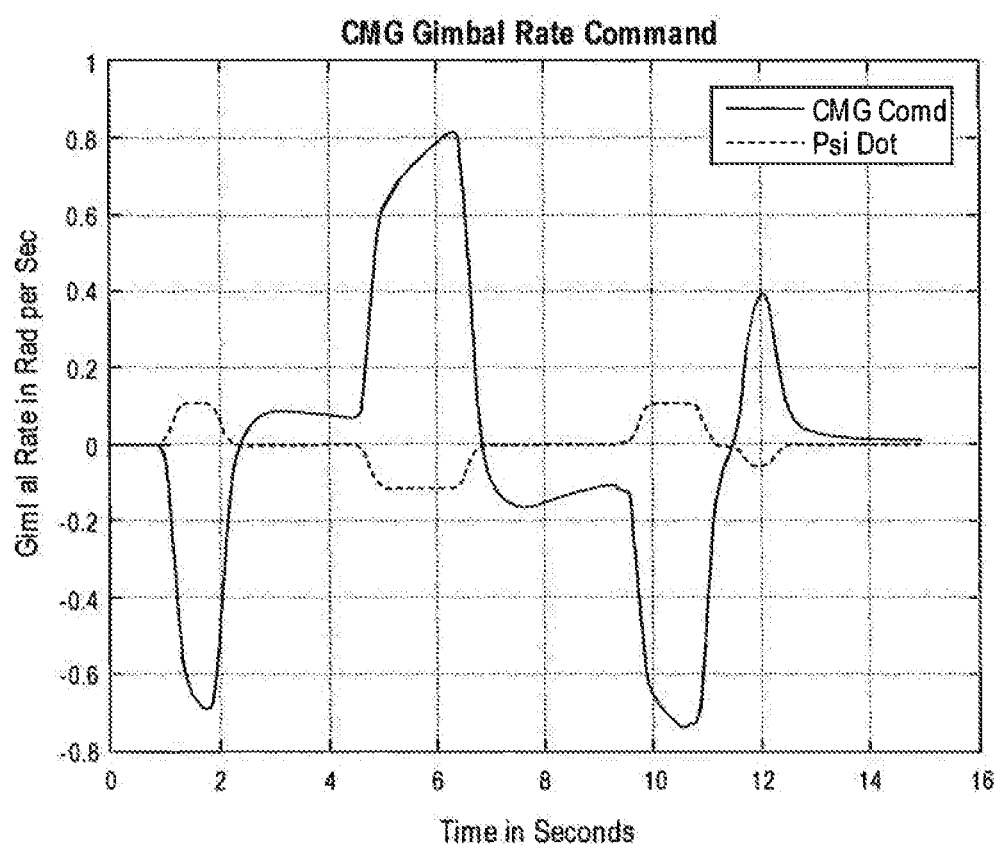
FIG. 3 is an illustration of front wheel rate and CMG gimbal rate in the operation of a two-wheeled vehicle.

FIG. 3 is an illustration of front wheel rate and CMG gimbal rate in the operation of a two-wheeled vehicle. Psi, the front wheel angle, generates the centrifugal force. With the correct scale factor the steering derivative could push the CMG gimbal rate command and cause the bike to roll over faster. Further, if the bike rolled over faster, the gravitational torque would better compensate for the centrifugal torque.

Figure 4:
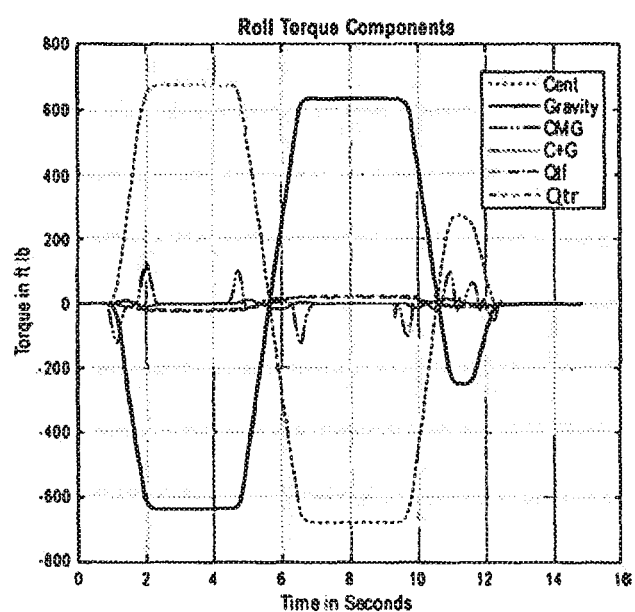
FIG. 4 is an illustration of CMG gimbal rate and the derivative of steering for a two-wheeled vehicle according to an embodiment.

FIG. 4 is an illustration of CMG gimbal rate and the derivative of steering for a two-wheeled vehicle according to an embodiment. In FIG. 4, the psi dot term is the same as illustrated in FIG. 3, but the CMG rate command is quicker, while the amplitude is smaller. The steering compensation causes the centrifugal force torque and gravitational torque to more closely match, resulting in a lower CMG torque requirement. In some embodiments, the steering rate measurement may be utilized for improved control of a two-wheeled, self-balancing vehicle.

Figure 5:
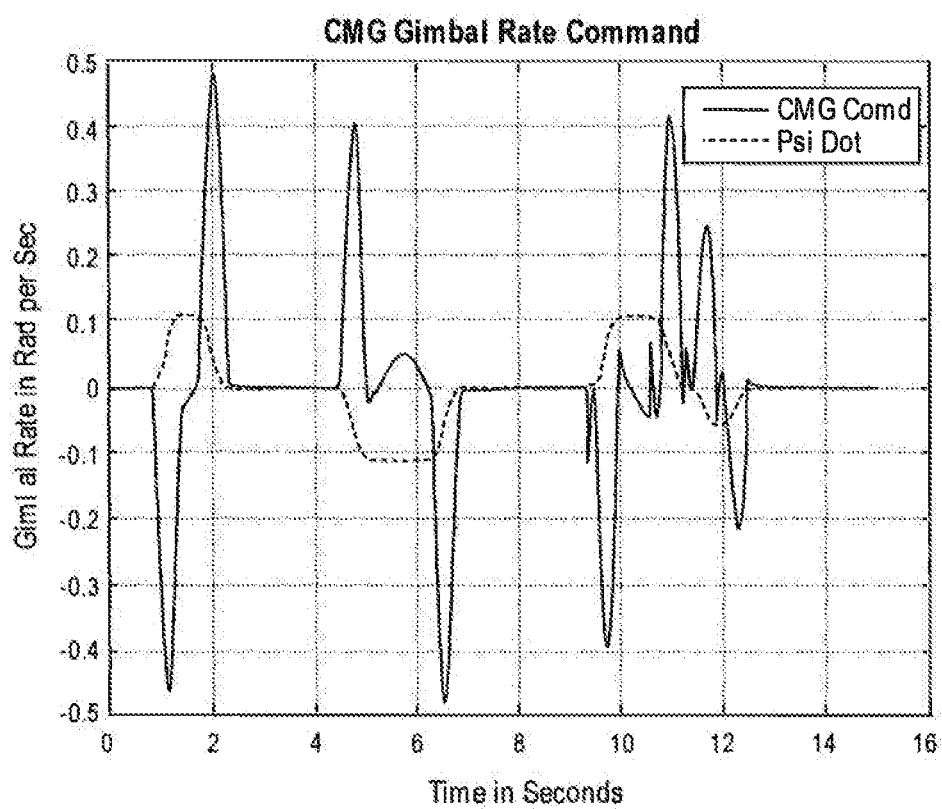
FIG. 5 is an illustration of CMG gimbal rate with steering compensation for control of a two-wheeled vehicle according to an embodiment.

FIG. 5 is an illustration of CMG gimbal rate with steering compensation (psi dot, or δ) for control of a two-wheeled vehicle according to an embodiment. In FIG. 5, the CMG gimbal rate reflects the CMG torque and the steering rate (φ) lead helps to push the bike over more quickly, resulting in a much smaller CMG compensation required. The centrifugal torque and the gravitational torques almost mirror each other. The torques from rotating the angular momentum of the front and rear wheels remain small.

Figure 6A:
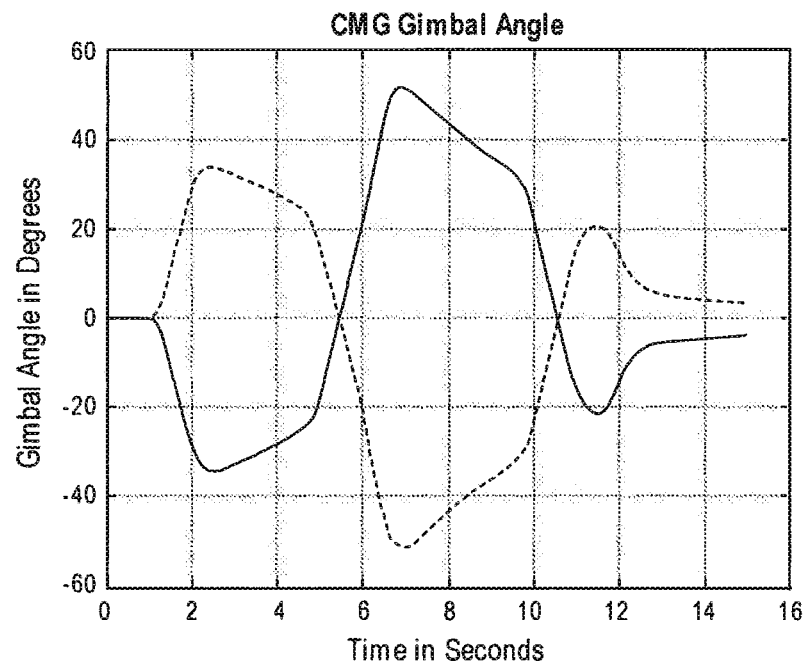
FIG. 6A and 6B are illustrations of CMG gimbal angle excursions before and after compensation according to an embodiment.
Figure 6B:
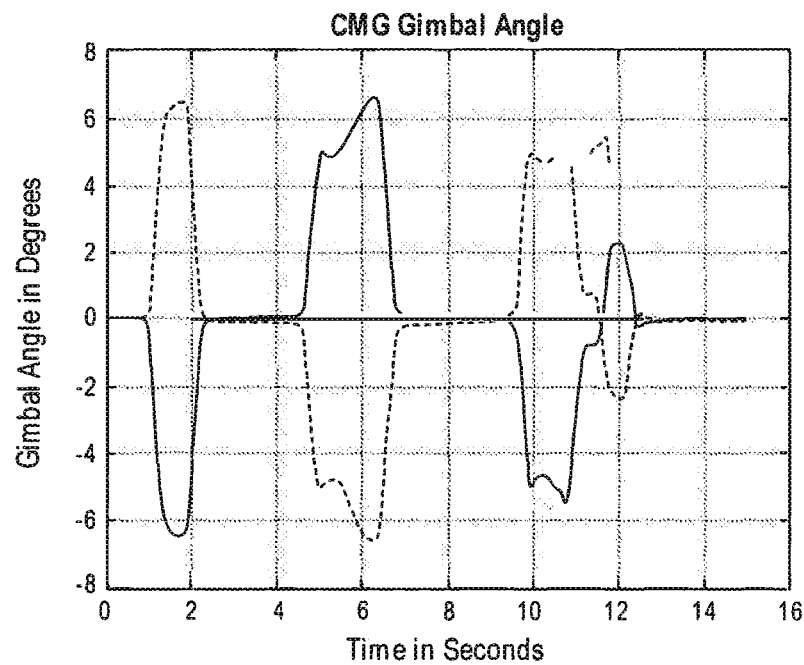

FIG. 6A and 6B are illustrations of CMG gimbal angle excursions before and after compensation according to an embodiment. In FIG. 6B after compensation, the compensation has reduced the CMG gimbal angle excursion significantly in comparison with the requirements for before compensation illustration in FIG. 6A. This is important because the CMGs generally only have a useful range of about plus or minus 70 degrees. Compensating for the centrifugal force induced torque has a speed term that has to be considered.

The equation for centrifugal force is:

$$F_C = M \cdot v^2 \cdot r \quad [3]$$

The force is proportional to the velocity squared and with a fixed geometry curve the force application is proportional to the velocity term. This means the difficulty in making a curve increases as velocity cubed. In the case of the motorcycle the radius of the curve is a function of the steering angle (psi).

$$\tan(\psi) = \frac{p}{r} \quad [4]$$

$$r = \frac{p}{\tan(\psi)} \quad [5]$$

$$F_c = \frac{m \cdot v^2}{p} \frac{\sin(\psi)}{\cos(\varphi)} \quad [6]$$

To anticipate a force, the time derivative of the force may be applied:

$$\dot{F}_c = \frac{m}{p} 2 \cdot v \cdot \dot{v} \frac{\sin(\psi)}{\cos(\phi)} + \frac{m \cdot v^2}{p} \frac{\cos(\psi)}{\cos(\varphi)} \dot{\psi} - \frac{m \cdot v^2}{p} \frac{\sin^2(\psi)}{\cos^2(\varphi)} \dot{\psi} \quad [7]$$

If the velocity is a constant then the time derivative is zero.

$$\dot{F}_c = \frac{m \cdot v^2}{p} \left(1 - \frac{\sin^2(\psi)}{\cos^2(\varphi)}\right) \dot{\psi} \quad [8]$$

For a fixed geometry, turn psi dot is proportional to velocity, and force is proportional to velocity cubed. As a result, the ideal compensation may be expressed as:

$$\text{Comp} = -k \cdot \dot{\psi} \cdot v^2 \quad [9]$$

The k in the linear region of operation is larger than the k required when the CMG gimbal rate commands saturate. Calculating the k for intermediate speed and for a speed resulting in at an extreme roll angle allows a compensation fit of the form:

$$\text{Comp} = -k \cdot \dot{\psi} \cdot v^n \quad [10]$$

In this form k is a constant and n is rational instead of an integer.

In some embodiments, the final control topology consideration is steering augmentation. Using computer compensated steering reduces the load on the CMG as well as providing a backup control in the unlikely circumstance that both CMGs were to fail on the same trip. By taking the psi dot off of the steering wheel and adding the steering augmentation between the steering wheel and the front wheel, the steering augmentation will not reduce the feedforward into the CMG gimbal rate command. The steering augmentation is a correction to the commanded steering that starts the bike to roll in the correct direction. As such the steering augmentation is in the opposite direction as the steering command. This is accomplished by using a lead-lag compensation term with the lead in the right hand complex plane.

Figure 7:
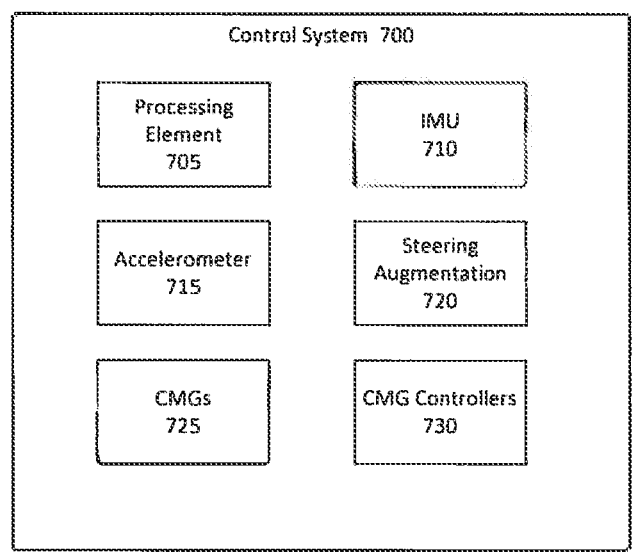
FIG. 7 is an illustration of components of a control system for a two-wheeled self-balancing vehicle.

FIG. 7 is an illustration of elements of a control system for a two-wheeled self-balancing vehicle according to an embodiment. In some embodiments, the control system 700 includes sensors and control elements for a two-wheeled self-balancing vehicle, including the following:

705: A processing element to process data for the control of the vehicle.

710: An inertial measurement unit (IMU) to measure specific force and angular rate for the vehicle.

715: An accelerometer to measure a lateral acceleration of the vehicle.

720: A steering augmentation element to augment a steering command for the vehicle.

725: One or more CMGs, which may include a first CMG and a second CMG, the first and second CMGs having angular momentum vectors pointing in opposite directions.

730: One or more CMG controllers to control a gimbal rate for the one or more CMGs.

In some embodiments:

(1) A control system for a two-wheeled vehicle is to utilize y-axis acceleration, instead of IMU angle, to measure the roll axis angle.

(2) A control system for a two-wheeled vehicle is to utilize steering rate to cause the CMG gimbal rate to move earlier.

(3) A control system for a two wheel vehicle is to measure the steering rate of the steering wheel command, instead of the front wheel turning rate, and thus separates the operator action from the wheel motion for generating rate compensation. This reduces the interference between steering augmentation and CMG gimbal rate compensation.

In some embodiments, a control system for a two-wheeled vehicle includes an inertial measurement unit (IMU); one or more control moment gyroscopes (CMGs); one or more CMG controllers to control the one or more CMGs; an accelerometer to measure a y-axis acceleration for the vehicle, the y-axis of the vehicle being perpendicular to a direction of travel of the vehicle and parallel to a ground surface; and a processing element to calculate a roll angle for the vehicle based at least in part on the y-axis acceleration measured by the accelerometer, determine a force component based at least in part on the calculated roll angle, and generate a CMG command for a CMG gimbal rate based at least in part on the determined force component.

In some embodiments, the force component is a total force on a center of gravity of the vehicle multiplied times a sine of an angle between the direction of the force and the direction to a roll axis.

In some embodiments, the measurement of y-axis acceleration by the accelerometer enables detection of slippage of a tire of the vehicle based on a change in lateral acceleration.

In some embodiments, the one or more CMGs include two CMGs with angular momentum vectors in opposite directions.

In some embodiments, the processing element is further to determine a steering augmentation value to modify a steering command for the vehicle, the processing element to modify the determination of the force component and CMG command based on the steering augmentation value.

In some embodiments, a control system for a two-wheeled vehicle includes an inertial measurement unit (IMU); one or more control moment gyroscopes (CMGs); one or more CMG controllers to control the one or more CMGs; a steering augmentation unit to augment a steering command by a determined steering augmentation value; and a processing element to modify a determination of a CMG command for the one or more CMG controllers based at least in part on application of the steering augmentation value.

In some embodiments, application of the steering augmentation value is to cause a CMG gimbal rate to be advanced.

In some embodiments, the application of the steering augmentation value is to reduce an amount of CMG compensation required for control of the vehicle.

In some embodiments, the steering augmentation is to start the vehicle to roll in a correct direction, the steering augmentation being in an opposite direction as the steering command.

In some embodiments, the steering augmentation is to operate as a backup CMG control upon a failure of the one or more CMGs.

In some embodiments, a method includes measuring with an accelerometer a y-axis acceleration for a two-wheeled vehicle, a y-axis of the vehicle being perpendicular to a direction of travel of the vehicle and parallel to a ground surface, the vehicle including one or more control moment gyroscopes (CMGs); calculating a roll angle for the vehicle based at least in part on the y-axis acceleration measured by the accelerometer; determining a force component based at least in part on the calculated roll angle; and generating a CMG command for a CMG gimbal rate based at least in part on the determined force component.

In some embodiments, the force component is a total force on a center of gravity of the vehicle multiplied times a sine of an angle between the direction of the force and the direction to a roll axis.

In some embodiments, the method further includes detecting slippage of a tire of the vehicle based on a change in lateral acceleration using the measurement by the accelerometer.

In some embodiments, the method further includes determining a steering augmentation to modify a steering command.

In some embodiments, the generation of the CMG command is further based at least in part on the steering augmentation.

In some embodiments, application of the steering augmentation is to cause a CMG gimbal rate to be advanced.

In some embodiments, application of the steering augmentation is to reduce an amount of CMG compensation required for control of the vehicle.

In some embodiments, the method further includes providing a backup CMG control utilizing the steering augmentation upon a failure of the one or more CMGs.

In some embodiments, the steering augmentation is to start the vehicle to roll in a correct direction, the steering augmentation being in an opposite direction as the steering command.

Further embodiments of the invention add the capability of using steering to augment the balance control of a two-wheeled vehicle, e.g., a bicycle, electric bicycle ("ebike"), scooter, electric scooter, moped, or motorcycle. A control architecture according to this embodiment enables a two wheeled vehicle with simultaneously or alternating mechatronic attitude control systems to balance autonomously at rest or while dynamically driven with mechatronic command. The torque produced by changing the angle of the wheel or wheels steering the vehicle increases at the speed squared of the vehicle. Thus it has no effect at zero speed and produces large torques at the vehicle's highest speeds. The addition of steering actuation to a drive-by-wire steering system for vehicle balance control increases the stability of the vehicle at the higher speeds when larger forces are needed, enabling stability control with smaller, lighter, CMGs and/or increasing the agility of the controlled vehicle.

With reference to FIG. 8, an embodiment 800 of the invention comprises a two-wheeled vehicle 825 to be controlled, and system components 801, including one or more attitude sensors (in an Inertial Measurement Unit 805), one or more state balanced noise filters 810, a control system 815, and one or more balance control actuators 820.

The Inertial Measurement Unit (IMU) 105 receives input from the one or more attitude sensors and measures the lateral acceleration of the two-wheeled vehicle in the y-axis direction, and the rotational rate and rotation position of the two-wheeled vehicle in the x-axis direction. In this embodiment, the coordinate system origin is at the contact of the rear wheel with the ground, the x axis is the roll axis of the vehicle in the direction from the rear wheel to the front wheel, the y axis is perpendicular to the direction of travel and parallel to the ground and pointing to the left (or right) of the direction of travel, and the z axis is perpendicular to the direction of travel and is pointing up (or into the ground).

There are two measurements used to control the balance of the two-wheeled vehicle, according to an embodiment: the roll rate, and the effective roll angle. The roll rate can be used directly. The effective roll angle comprises two vectors: the sum of the centrifugal force and the gravitational force, and the direction from the center of gravity to the centerline of the wheel contact with the ground. The effective roll angle is the difference between these two vectors.

Neither the lateral acceleration nor a gyro calculated roll angle can be used directly to control the balance of the two-wheeled vehicle. The lateral acceleration measures the roll component of force acting in the y-axis direction. This force has three major terms and three smaller terms that can, in first order control, be ignored. These torque terms can be separated into two groups depending on the source. An accelerometer measures zero acceleration in free fall in a vacuum. The upward force from the road is the accelerating force preventing freefall. If this force is parallel to the z-axis of the IMU then there isn't any y-axis component. The force component of y-axis acceleration is proportional to the force and the sine of the angle that would bring the force into equilibrium.

The second class of components is the attitude sensor(s) in IMU 805 (e.g., an accelerometer) that measures the torques acting on the two-wheeled vehicle. The torques react with the force generated by the wheel (tire) ground contact. The torques accelerate the moment of inertia in the roll axis and accelerate the IMU in the y direction. The aerodynamic torque is low compared to the centrifugal force generated torque, in one embodiment, because of the near symmetry of the two-wheeled vehicle (e.g., a motorcycle). The torques generated by the rotating angular momenta of the wheels are also small as shown in FIGS. 2 and 4. The torque generated by one or more Control Moment Gyros (CMGs) is significant as seen in FIGS. 2 and 4, and is a noise element in the measurement that can be eliminated, by subtracting the properly conditioned CMG gimbal rate signals. This yields a signal that is a measurement of the unbalance of the two-wheeled vehicle about its operating point whether going straight or in a turn.

The other attitude measurement performed by the attitude sensors is the gyro measurement of the body angle. This provides information as to whether the two-wheeled vehicle is straight up and down, which is fine while the vehicle is traveling in a straight line, but is in error when the vehicle is traveling through a turn. A calculation as to the proper roll angle as a function of speed can be used to compare to the gyro angle measurement, but if a tire slides on the pavement there is an error in the speed measurement.

The second module of the balance control consists of coordinated noise filters 810, such that the amplitudes of the system gains from roll torque to filter output do not cross. The gain from torque applied to the roll axis of the two-wheeled vehicle to the output of the various noise filters should have the same slope on a Bode plot at high frequency, with the same phase shift at high frequency. The torque to torque is algebraic, torque to roll rate has one integration, and the torque to position has two integrations. This means that the noise filter for roll rate has one more pole than the position filter, and the acceleration noise filter has two more poles than the position filter. With three parallel loops, the high frequency Bode plots do not cross to prevent high frequency zeros, due to parallel compensation design. A zero in the left hand plane of the Laplace domain is stable but a zero in the right hand plane will pull a pole toward it and become unstable. Therefore the filter is designed so that is not possible, according to one embodiment. In another embodiment, a lower slope on a Bode plot for the highest gain branch, and more slope in lower gain branches, prevents high frequency zeros from being generated.

The control system 815 is coupled to the outputs of the coordinated noise filters 810 and provides position control using two actuators acting on the same parameter to be controlled.

Figure 9A:
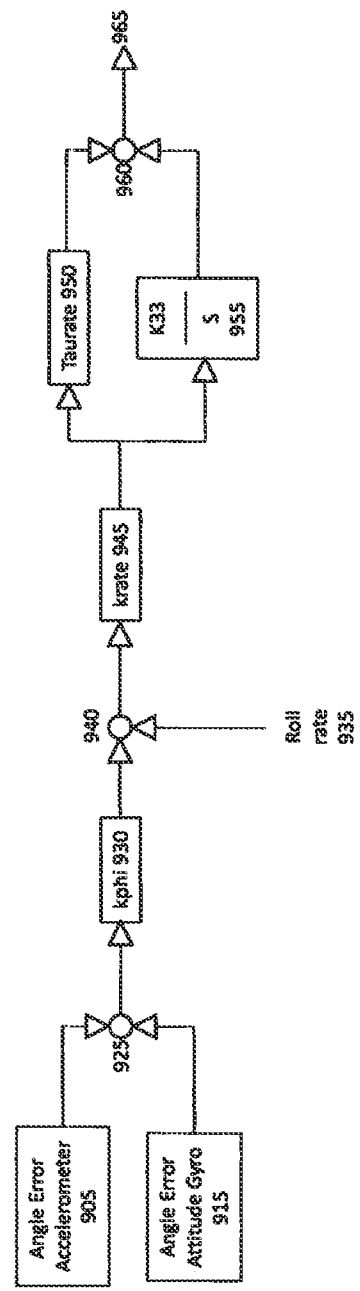
FIG. 9A illustrates aspects of an embodiment of the invention.

With reference to the embodiment 900 illustrated in FIG. 9A, angle error accelerometer 905 receives an accelerometer signal and produces an angle error, kp 210. Likewise, CMG gimbal rate produced acceleration 915 procures an angle componentl-kp 920. The value of the proportion gain kp is between zero and one making the sum of the two paths equal to one. The optimum performance is when kp is equal to one. The sum of the errors is passed through a gain kphi at 930 that, according to one embodiment, has units of radians per second of rate command per radian of attitude error. The roll rate command, the result of summer 925, is compared to the filtered roll rate 935 and passed through a network with an integrator with a lead 945, 955, 950 and 960. The result is a torque command, output at 965.

Figure 9B:
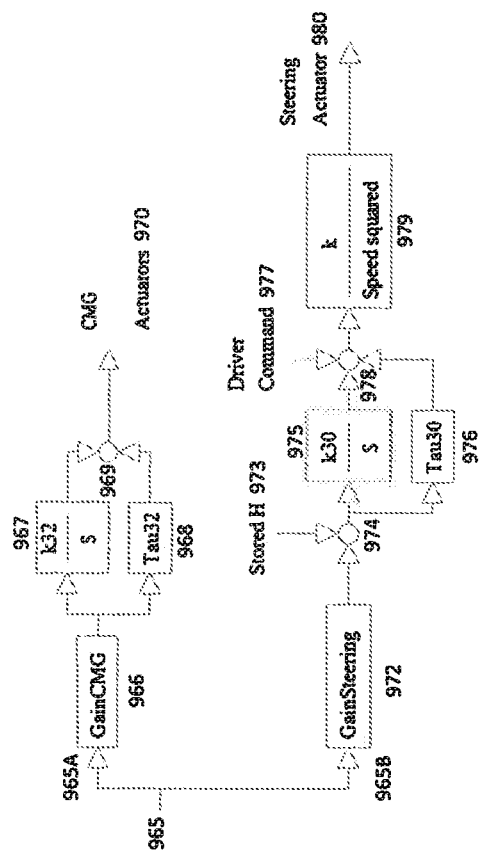
FIG. 9B illustrates aspects of an embodiment of the invention.

With reference to FIG. 9B, the torque command 965 is split into two paths, 965A and 965B. Each path is compensated such that the loop gain through the two-wheeled vehicle dynamics for the CMG control is similar to the steering control and actuator path. The control paths work in concert so each is dominate in the speed domain where it works best.

This configuration of control yields some remarkable improvements in vehicle control. The properties of CMGs are such that there is a limited amount of angular momentum for use as a roll torque actuator. Angular momentum has units of torque seconds and as such can transfer angular momentum that generates torque for a limited amount of time. With the two-wheeled vehicle stopped or moving at slower speeds there is plenty of torque available to balance the bike including turning at slow speeds. As the speed increases, the torques generated by centrifugal force increase as the square of the speed. Adding steering stability augmentation to the balance control enables torques that also increase with speed squared. The steering gain is reduced for low speeds and goes away as the vehicle stops but is fully capable for high speed maneuvers.

Figure 10:
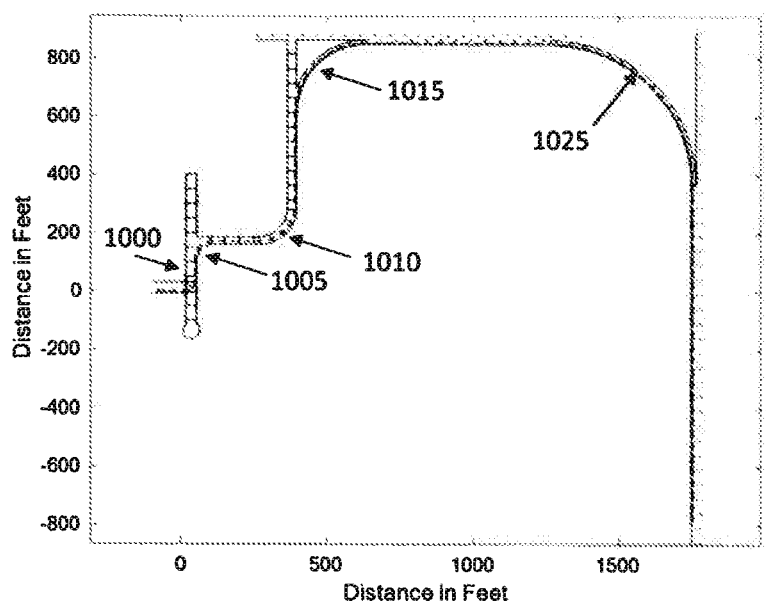
FIG. 10 illustrates a simulated set of five 90 degree curves according to embodiments of the invention.

The augmented steering control system, according to embodiments of the invention, used a simulated set of five 90 degree curves 1000, 1005, 1010, 1015, and 1025, each with a turning radius that was double of the previous one, as illustrated in FIG. 10.

Figure 11:
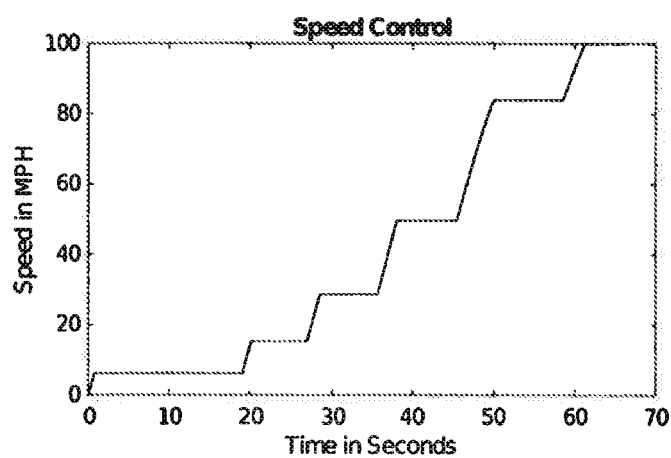
FIG. 11 shows a plot of speed as a function of time according to embodiment of the invention.
Figure 12:
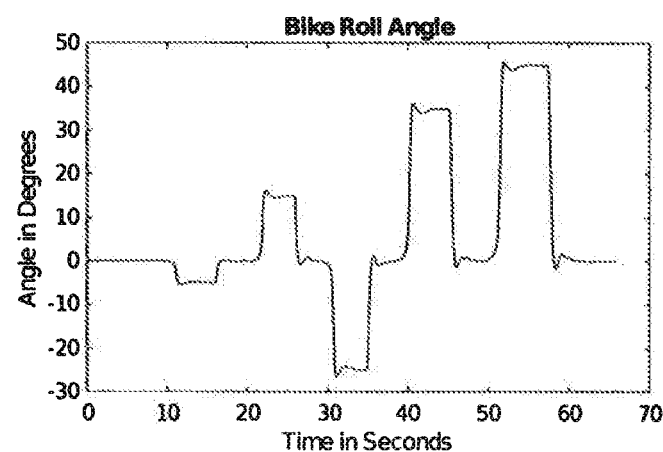
FIG. 12 shows resulting roll angles based on the plot of speed as a function of time illustrated in FIG. 4.

The simulation showed that stability is achieved over the full speed range of the vehicle. In generating a full speed range, the first curve used a speed appropriate for a 5 degree roll angle, the second curve used a speed appropriate for a roll angle of 15 degrees, the third, 25 degrees, the fourth, 35 degrees and the fifth, 45 degrees. With reference to FIG. 11, the plot of the speed as a function of time shows six speed plateaus, for example, a speed of 100 miles per hour is after the fifth turn. The resulting roll angles are as shown in FIG. 12.

Figure 13:
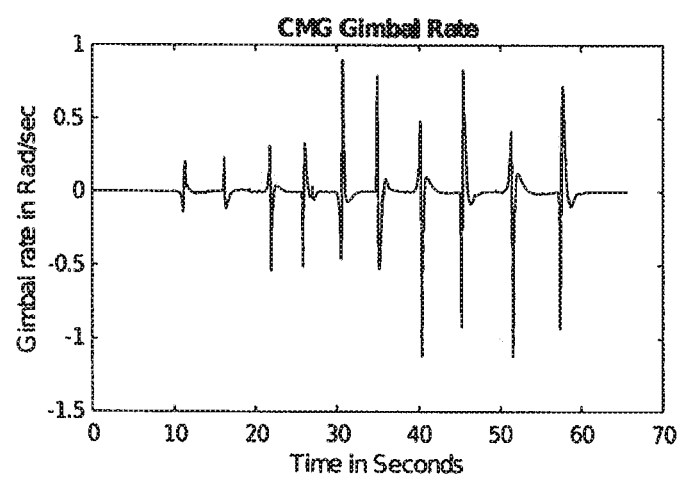
FIG. 13 illustrates the gimbal rate for movement of CMGs to provide a balancing torque for a two-wheeled vehicle when entering and exiting a turn according to embodiments of the invention.
Figure 16:
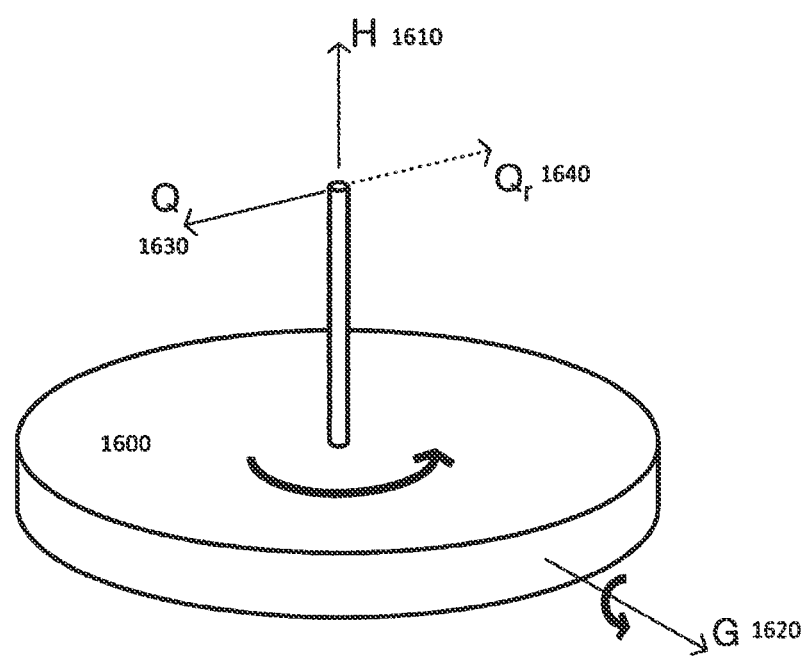
FIG. 16 is a diagram of control moment gyros that produce torque proportional to the gimbal rate in accordance with an embodiment of the invention.

The control moment gyros produce torque proportional to the gimbal rate shown in FIG. 16. The flywheel 1600 turns about the spin axis producing angular momentum H 1610. The gimbal having an axis G 1620 perpendicular to the spin axis rotates the angular momentum vector. Rotating the angular momentum vector H generates a torque Q 1630. The reaction torque QR 1640 is equal and opposite the torque Q 1630. The reaction torque is the torque the vehicle receives. The faster the gimbal is rotated the more torque is generate and the faster the torque vector precesses. Torques are applied transitioning into and out of each corner. The gimbal rate illustrated in FIG. 13 shows the movement of the CMGs to provide balancing torque when entering and exiting a turn.

Figure 14:
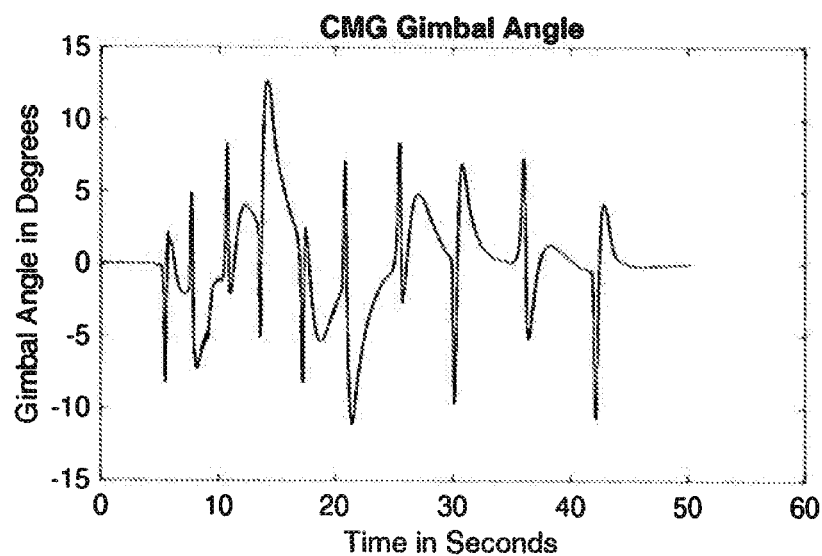
FIG. 14 illustrates bringing stored angular momentum (H) to zero by biasing angle sensors according to embodiments of the invention.

The CMG gimbal angles are brought back to the zero (center) position by means of the stored angular momentum control 142, 144 and 150 of FIGS. 1 and 973 of FIG. 9B. As seen in FIG. 14, the stored angular momentum (H) is brought back to zero by biasing the vehicle angle sensors.

Figure 15:
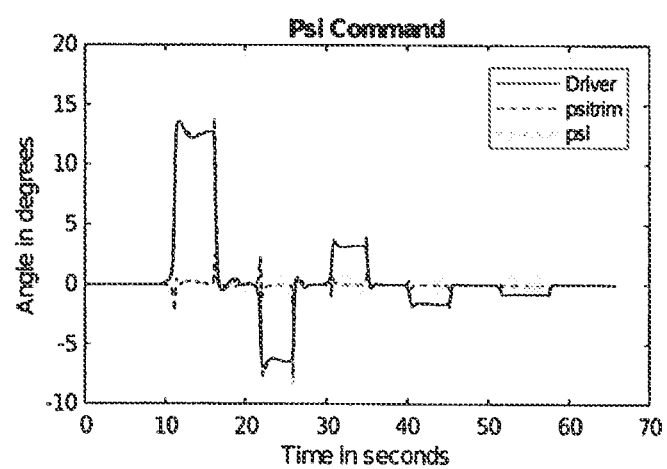
FIG. 15 is a graph of steering angle, driver input, and a control trim, according to embodiments of the invention.

Finally, with reference to FIG. 15, the steering angle is made up of two terms: a driver input (Driver in FIG. 15) and a control trim (psitrim in FIG. 15). The steering angle psi ($\psi$) has a trim term produced by the steering control loop 980 of FIG. 9B. The stability trim motion of the steering wheel gets smaller as the vehicle speed increases, because steering wheel motion produces a torque that is proportional to speed squared.

The simulation of the driver is a driver or control (e.g., remote control) that aims the two-wheeled vehicle to a preferred position in the road ahead. The aiming position in the road moves forward with respect to the vehicle as speed increases. There is no attempt by the driver to balance the two-wheeled vehicle; all balance is achieved by the control. In one embodiment, steering can be mechanized several different ways including: drive by wire, where the control steering is enabled by a clutch that disconnects the mechanical backup and the driver and control portions of the steering are performed by a computer or processing element that controls a servo actuator to turn the steering wheel. In another embodiment, a mechanical differential sums the mechanical motion of the steering wheel and the control motion through a servo-actuator. The motor has a brake that is powered off for stability augmented control and is engaged in mechanical only backup mode. The steering can be front wheel, rear wheel of both wheels. Thus the two-wheeled vehicle can be driven with traditional car like controls without the driver giving thought in the moment to balancing the two-wheeled vehicle.

The merged control improves recovery from loss of traction over a self-balancing motor cycle or two-wheeled vehicle with only CMG balancing control. In one embodiment, in a skid, the CMG balancing control will start to bring the two wheeled vehicle upright, and when the low friction region is passed and recovery starts on a high friction surface, the augment stability in the steering will lower the over torque from the wheel sliding on dry pavement. When hitting the dry pavement from a skid, say on ice, the wheels and the direction of motion will not be the same and there is a recovery distance of the tire sliding on dry pavement to bring all the mechanics back to a rolling condition.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein via circuitry, logic, or processor-executed software modules. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

What is claimed is:

1. A balance control system for a two-wheeled vehicle, comprising:
   one or more control moment gyroscopes (CMGs) to generate an angular momentum;
   an accelerometer to measure a y-axis acceleration for the two-wheeled vehicle based on a combination of an acceleration of the two-wheeled vehicle due to a centrifugal force, an acceleration of the two-wheeled vehicle due to a gravitational force, and an acceleration of the two-wheeled vehicle due to the one or more CMGs, the y-axis of the vehicle being perpendicular to a direction of travel of the two-wheeled vehicle and parallel to a ground surface, the accelerometer to produce a first angle error based at least in part on the y-axis acceleration measured by the accelerometer;
   one or more CMG controllers to control a gimbal rate for the one or more CMGs;
   a processor to:
      calculate a roll angle for the two-wheeled vehicle based at least in part on the y-axis acceleration measured by the accelerometer;
      determine a force component based at least in part on the calculated roll angle; and
      generate a CMG command for the CMG controllers to control the gimbal rate for the one or more CMGs based on the determined force component, and a difference between a desired vehicle roll rate and a vehicle roll rate as measured by the CMG, and produce a second angle error based on the gimbal rate for the one or more CMGs;
      generate a sum of the first and second angle errors;
      generate a roll rate command based on the sum of the first and second angle errors;
      generate a filtered roll rate by applying a noise filter to the measurements received from the accelerometer;
      compare the roll rate command and the filtered roll rate;
      generate a torque command based on the comparison of the roll rate command and the filtered roll rate;
   the one or more CMG controllers to control the gimbal rate for the one or more CMGs to change the angular momentum at least in part in response to the torque command; and
   a steering augmentation unit to augment a steering command at least in response to the torque command.

2. A method for controlling an angular momentum stored by a Control Moment Gyroscope (CMG) for a two-wheeled vehicle, comprising:
   determining the angular momentum stored by the CMG array as a remainder angular momentum of a sum of angular momentum of the two-wheeled vehicle and a total angular momentum determining the angular momentum stored by the CMG array as a remainder angular momentum of a sum of angular momentum of the two-wheeled vehicle and a total angular momentum stored by the CMG array; stored by the CMG array; and
   calculating an offset in a roll angle sensor based on an excess angular momentum stored in the CMG array such that a sum of an external torque from one or more forces including centrifugal, gravity, wind, force biases the roll angle sensor to produce an external torque on the two-wheeled vehicle such that the angular momentum stored by the CMG array is restored to zero.

* * * * *